(12) United States Patent
Abraham et al.

(10) Patent No.: US 7,647,247 B2
(45) Date of Patent: Jan. 12, 2010

(54) METHOD AND SYSTEM TO ENHANCE WEB-BASED SHOPPING COLLABORATIONS

(75) Inventors: Subil M. Abraham, Plano, TX (US); James P. Appleyard, North Richland Hills, TX (US); Jason A. Gonzalez, Dallas, TX (US); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 11/005,356

(22) Filed: Dec. 6, 2004

(65) Prior Publication Data

US 2006/0122895 A1 Jun. 8, 2006

(51) Int. Cl.
*G06Q 30/00* (2006.01)
(52) U.S. Cl. .......................................... 705/26
(58) Field of Classification Search .................. 705/26, 705/27
See application file for complete search history.

(56) References Cited

U.S. PATENT DOCUMENTS

| | | | |
|---|---|---|---|
| 5,905,973 A | 5/1999 | Yonezawa et al. | |
| 6,247,130 B1 | 6/2001 | Fritsch | |
| 6,266,649 B1 | 7/2001 | Linden et al. | |
| 6,473,738 B1 | 10/2002 | Garrett | |
| 6,850,899 B1* | 2/2005 | Chow et al. | 705/26 |
| 6,876,977 B1* | 4/2005 | Marks | 705/26 |
| 2002/0052948 A1 | 5/2002 | Baudu et al. | |
| 2005/0022119 A1* | 1/2005 | Kraemer | 715/513 |
| 2005/0114228 A1* | 5/2005 | Wadhwani | 705/26 |
| 2007/0078727 A1* | 4/2007 | Spiegel et al. | 705/26 |
| 2007/0214271 A1* | 9/2007 | Griffin et al. | 709/227 |

OTHER PUBLICATIONS

Thomas Content, "e-retaiers try to make it easier for shoppers to buy", USA Today, McLean, Va, Dec. 22, 19999, p. 03B http://proquest.umi.com/pqdweb?did=47476223&sid=9&Fmt=3&clientId=19649&RQT=309&VName=PQD.*

* cited by examiner

*Primary Examiner*—Mila Airapetian
(74) *Attorney, Agent, or Firm*—Novak Druce + Quigg LLP

(57) ABSTRACT

A method for collaborating between Web-based shopping carts can include the step of identifying a Web-based shopping cart associated with an online store and a shopper of the online store. Access privileges can be established between the shopping cart and at least one other shopping cart, the other shopping carts being associated with shoppers different from the shopper. A linkage can be established between the Web-based shopping cart and the at least one other shopping cart in accordance with the access privileges. Through the linkage, the shopper can be permitted to access items in the another shopping cart.

14 Claims, 2 Drawing Sheets

METHOD AND SYSTEM TO ENHANCE WEB-BASED SHOPPING COLLABORATIONS

BACKGROUND

1. Field of the Invention

The present invention relates to the field of electronic commerce and, more particularly, to Web-based shopping collaborations.

2. Description of the Related Art

Web-based shopping is primarily a solitary experience involving little to no interactions among online shoppers. That is, no online analog exists for a typical real world experience where two or more individuals often collaborate on purchases. The collaboration often involves pleasurable social interactions, impulse purchases, mutual compromise, a synthesis of ideas regarding a purchase, and other such benefits. The lack of collaboration associated with Web-based shopping results in a less robust shopping experience for many and, thereby, reduces the market effectiveness of Web-based shopping.

Known attempts to enhance an online experience using conventional collaboration technologies suffer from significant drawbacks. A simple solution is for several shoppers to individually conduct Web-based shopping sessions and to communicate the results of these sessions to the other shoppers via phone, email, chatting, instant messaging, or any other communication means. The complexity of these manually maintained communication sessions geometrically increases as the number of collaborating shoppers increases. Additionally, this manual collaboration process is extremely slow, cumbersome, and often frustrating. For instance, shoppers attempting to communicate session results with other shoppers often fail to provide sufficient details to permit a result to be located or inadvertently specify a different item than they intended. Further, the process of searching for each referenced item, even when specified in sufficient detail, can be arduous. Finally, online shopping Web sites often dynamically change, causing items to be sold out, re-priced, and related, all of which can be problematic.

Another way to collaborate is to establish a co-browsing session where several session participants share a desktop, so that each participant can commonly experience a single online shopping session. This results in all items being placed within a single shopping basket. It also requires all participants to view the same session at the same time. This can be very annoying to shoppers, who will often be forced to focus upon items in which they have little interest or forced to rush in examining items of interest in consideration of others. This approach poorly mirrors a real world shopping scenario, where shoppers can independently shop and intermittently gather in a common location to collaborate upon purchases.

SUMMARY OF THE INVENTION

A system, framework, method, and apparatus that permits Web-based shoppers to collaborate by sharing their shopping cart items with other shoppers. The sharing can occur between two or more shoppers, each shopper interacting with an online store in a shopper-specific fashion. Further, items can be shared between shopping carts regardless of whether an associated shopper is online at the time of the sharing. In one embodiment, the invention can be implemented within an online store portal that includes a shopping cart portlet and at least one collaborating shopping cart portlet, where items can be transferred between the shopping cart portlet and the collaborating shopping cart portlets.

Turning to specific aspects of the invention, the invention can include a method for collaborating between Web-based shopping carts. The method can include the step of identifying a Web-based shopping cart associated with an online store and a shopper of the online store. Access privileges can be established between the shopping cart and at least one other shopping cart, the other shopping carts being associated with shoppers different from the shopper. A linkage can be established between the Web-based shopping cart and the at least one other shopping cart in accordance with the access privileges. Through the linkage, the shopper can be permitted to access items in other shopping carts.

In another aspect, the invention can include a shopping cart for Web purchases. The shopping cart can including an item selection interface element, a checkout interface element, and a collaboration interface element. The item selection interface element can permit a shopper logged onto an online store to selectively place items of the online store into the shopping cart. The checkout interface element can permit the shopper to check out items contained within the shopping cart to purchase the items contained within the shopping cart. The collaboration interface element can permit a collaboration between the shopping cart and at least one other shopping cart, where the other shopping cart is distinct from the shopping cart and is associated with another shopper of the online store.

In still another aspect, the invention can include a collaborative Web shopping framework that includes a first session memory space, a second session memory space, and a hub. The first session memory space can record interactions associated with a first interactive shopping session between a Web shopping portal and a first user. The recorded interactions can include items placed within a first shopping cart associated with the first interactive shopping session and state information for the first interactive shopping session. The second session memory space can record interactions associated with a second interactive shopping session between the Web shopping portal and a second user. The recorded interactions can include items placed within a second shopping cart associated with the second interactive shopping session and state information for the second interactive shopping session. The hub can connect the first shopping cart with the second shopping cart. The hub permits the first user to view items placed in the second shopping cart and permits the second user to view items placed in the first shopping cart.

It should be noted that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, any other recording medium, or distributed via a network.

It should also be noted that while collaborative shopping is one specific implementation for the present invention, the invention can be applied to similar Web-based operations that do not explicitly involve shopping. That is, the shopping cart described herein can represent any type of cart or holding place in which selected products/objects/items can be placed. The present invention, therefore, can be utilized by collaborators to share objects contained in collaborator specific containers, which are accessible via a Web interface.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
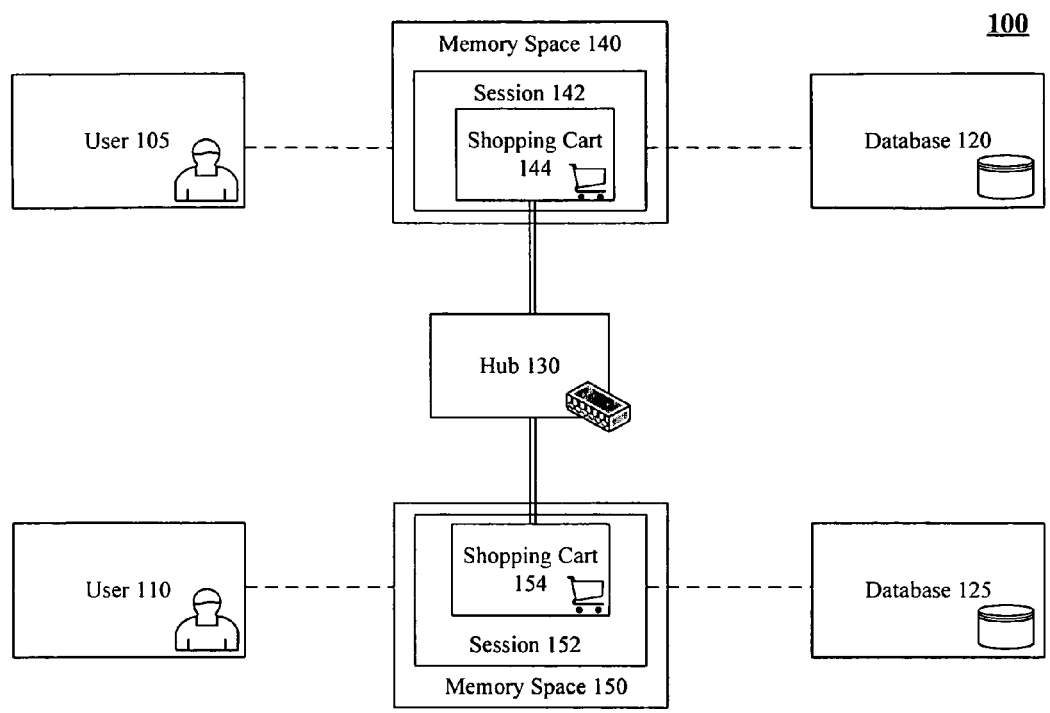
FIG. 1 is a schematic diagram of a collaborative shopping system in accordance with an embodiment of the present invention.

FIG. 1 is a schematic diagram of a collaborative shopping system 100 in accordance with an embodiment of the present invention. The collaborative shopping system 100 can be a Web-based shopping system, where users 105 and 110 can access one or more online stores through which purchases can be made. Each user 105 and 110 can utilize a local browser to connect via the Web to a remotely located memory space 140 and/or 150. Each memory space 140 and 150 can be memory spaces provided by one or more Web servers that serve Web pages for the Web-based shopping system.

Specifically, in system 100, the user 105 can establish an online shopping session 142 within a memory space 140. During the shopping session 142, the user 105 can place items within a shopping cart 144. The shopping cart 144 can be specifically linked to the user 105. User 105 specific settings, memory space 140 details, session 142 parameters, and shopping cart 144 items can be conveyed from the memory space 140 to database 120. Similarly, user 110 can establish an online shopping session 152 within a memory space 150, placing items in shopping cart 154 and storing data within database 125.

Additionally, a linkage can be established between shopping cart 144 and shopping cart 154 via hub 130. The linkage can permit user 105 to access items within shopping cart 152 and can permit user 110 to access items within shopping cart 144. In one embodiment, user 105 can establish configurable access privileges, which can determine which other users are permitted to access shopping cart 144 and can determine the privileges granted to these authorized users. User 110 can establish access privileges for shopping cart 154. Access privileges can include, but are not limited to, read, update, add, and delete privileges.

It should be noted that shopping session 142 and shopping session 152 are independent of one another, each being an interactive session between an online store and a shopper. That is, the linkage between the shopping carts 144 and 154 permits the sharing of shopping cart items in accordance with established privileges and does not result in a single co-browsing session involving user 105 and user 110. When session 142 occurs at the same time as session 152, items shared between shopping cart 144 and shopping cart 154 can be dynamically updated. Additionally, session 142 can occur before or after session 152, which can require users to utilize database 120 and 125 to manipulate shopping cart items stored from past shopping sessions.

It should further be noted that while memory space 140 and memory space 150 can be spaces from the same online shopping Web-site, system 100 is not limited in this regard. Instead, memory space 140 can be a space within a Web server for one online store and memory space 150 can be a space within a Web server for a different online store. Thus, hub 130 can link shopping carts 144 and 154, even though the shopping carts pertain to different stores.

Further, user 105 and user 110 can represent different login identities for the same shopper, who is able to utilize system 100 to share items between different Web-based stores. Each user 105 and 110 can also represent different shoppers having shopper-specific shopping carts 144 and 154 for the same or different online stores. Moreover, system 100 is not limited to two users and shopping carts associated with any number of other users (not shown) can be linked to shopping cart 144 and/or shopping cart 154 through hub 130. Consequently, linking shopping carts via hub 130 results in a scalable solution applicable to any number of shoppers.

On the client side, users 105 and users 110 can each access the Web-based shopping websites using a Web browser. On the server side, any of a variety of techniques can be utilized to link shopping cart 144 to shopping cart 154. The techniques used can depend upon how tightly integrated memory space 140 is to from memory space 150, whether a common data model is used within database 120 and 125 to store shopper specific information, the number of shoppers that are permitted to share shopping cart information with one another, and other such concerns.

In one embodiment, an framework based upon JAVA 2 ENTERPRISE EDITION (J2EE) can be used to link shopping cart 144 to shopping cart 154. The illustrative framework can implement shopping cart 144 and shopping cart 154 using stateful session JAVA beans, which would permit clients to maintain a conversation state with the Web-server containing each shopping cart and to implement the necessary business logic to hold items placed in each shopping cart.

Because memory space 140 and 150 can be volatile memory spaces within one or more Web servers, shopping cart items can be made persistent using databases 120 and 125. When databases are utilized, an interface between the shopping cart 144 and database 120 and/or between shopping cart 154 and database 125 can be necessary. In the J2EE framework, entity beans can be used as interfaces. Entity beans can use container maintained persistence (CMP) so as to maintain a level of independence between the shopping cart 144 (and associated implementation code) and the persistent data source (database 120).

The hub 130, which maintains connections between shopping cart 144 and shopping cart 154, can utilize stateless session beans. Stateless session beans can be used to conserve computing resources and increase runtime speed since the hub 130 (in certain embodiments) is not required to maintain conversational state data since its principle function is to establish connections between endpoints. Moreover, the hub 130 can manage connections using remote method invocation (RMI) or other such technique to allow shopping carts on different JAVA VIRTUAL MACHINES to be shared.

It should be appreciated that the present invention is not to be construed as limited to the J2EE framework discussed above, which is provide for illustrative purposes only. One of ordinary skill in the art can situationally adapt the concepts presented herein so as to implement these concepts using any computing framework. For example, a .NET framework or other framework can be utilized in place of the J2EE framework.

Figure 2:
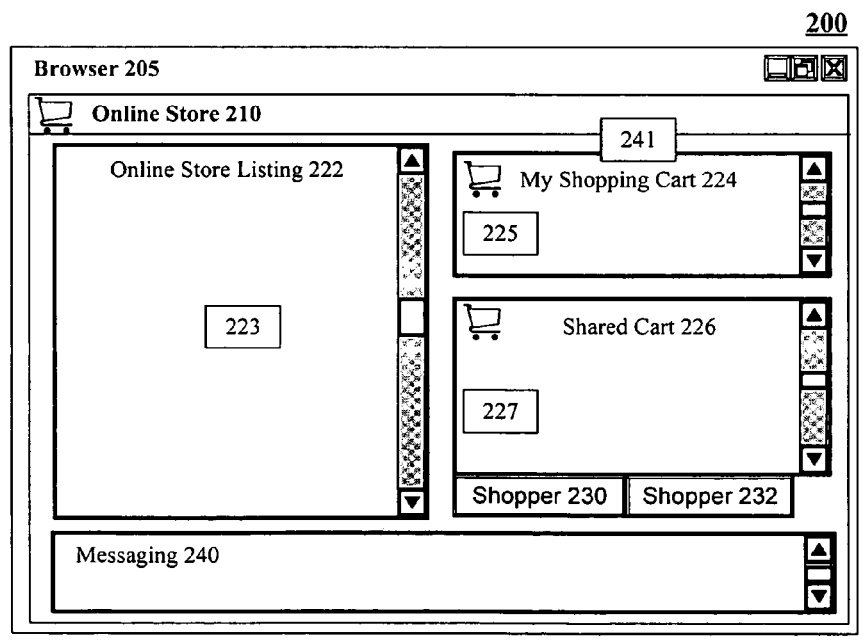
FIG. 2 is an interface for conducting collaborative shopping in accordance with an embodiment of the present invention.

FIG. 2 is a graphical user interface (GUI) 200 for conducting collaborative shopping in accordance with an embodiment of the present invention. The GUI 200 can be an interface used by user 105 and/or user 110 when shopping online.

GUI 200 can include a browser 205 window, where the browser 205 can be any Web browser through which an online shopping Web site is accessed. In the browser 205, the online store 210 portal can be presented. The online store 210 can include an Online Store Listing 222 portlet, a My Shopping Cart 224 portlet, a Shared Shopping Cart 226 portlet, and a Messaging 240 portlet.

The Online Store Listing 222 portlet can present items which can be purchased or added to the shoppers shopping cart. The My Shopping Cart 224 portlet can display items currently within the shopper's shopping cart. The Shared Cart 226 portlet can display items contained within the shopping carts of collaborating shoppers to which access privileges have been granted.

In one embodiment, different shoppers can be associated with different tabs. For instance, shopper 230 and shopper 232 can both have an associated tab. When the tab for shopper 230 is selected, the Shared Cart 226 portlet can display items associated with shopper 230 (in that shopper's shopping cart). When the tab for shopper 232 is selected, the Shared Cart 226 portlet can display items associated with shopper 232 (in that shopper's shopping cart). Additionally, the Messaging 240 portlet can permit messages, such as email, instant messages, chat messages, and the like, to be conveyed among collaborating shoppers.

The various portlets in GUI 200 can include user selectable elements, such as elements 223, 225, 227, and 241. Each of the user selectable elements 223, 225, 227, and 241 can be implemented as buttons, menus, toolbars, keyboard shortcuts, drop-and-drag mechanisms, and the like. Taken together the user selectable elements 223, 225, 227, and 241 can permit a user to perform various shopping, messaging, and collaboration tasks.

For example, the Online Store Listing 222 portlet can include an item selection interface element 223 through which a shopper logged onto the online store 210 can selectively place items from the Online Store Listing 222 portlet to the My Shopping Cart 224 portlet. A checkout interface element 225 can allow items contained in the My Shopping Cart 224 portlet to be checked out, thereby permitting a shopper to purchase the items. A collaboration interface element 227 can permit a collaboration between a user's shopping cart and at least one other shopping cart. For instance, the collaboration interface element 227 can permit a user to add an item from the Shared Cart 226 portlet to the My Shopping Cart 224 portlet.

Additionally, a user collaboration list element 241 can permit a user to grant other users with collaborative access to items appearing within the My Shopping Cart 224 portlet. That is, the user collaboration list element 241 can be used to establish a list of collaborating shoppers granted access to a shopping cart items.

It should be appreciated that GUI 200 is for illustrative purposes only and that the invention is not to be limited to the precise arrangements included herein. It should be appreciated that alternative interfaces contemplated herein can include additional user elements and derivatives of the shown elements, which can be included in whole or in part in the contemplated alternative interfaces. For example, each of the portlets 222, 224, 226, and 240 can be presented as separate windows or can be presented as separate Web pages (instead of being displayed at the same time).

Further, the alternative interfaces can be used in lieu of GUI 200. The alternative interfaces can include, but are not limited to, graphical interfaces, audible interfaces, tactile interfaces, and multimodal interfaces. These alternative interfaces as well as GUI 200 can be customized for a personal computer, a portable computing device, an embedded computing device, and any other device capable of performing programmatic actions that result from received input or result in presented output.

Figure 3:
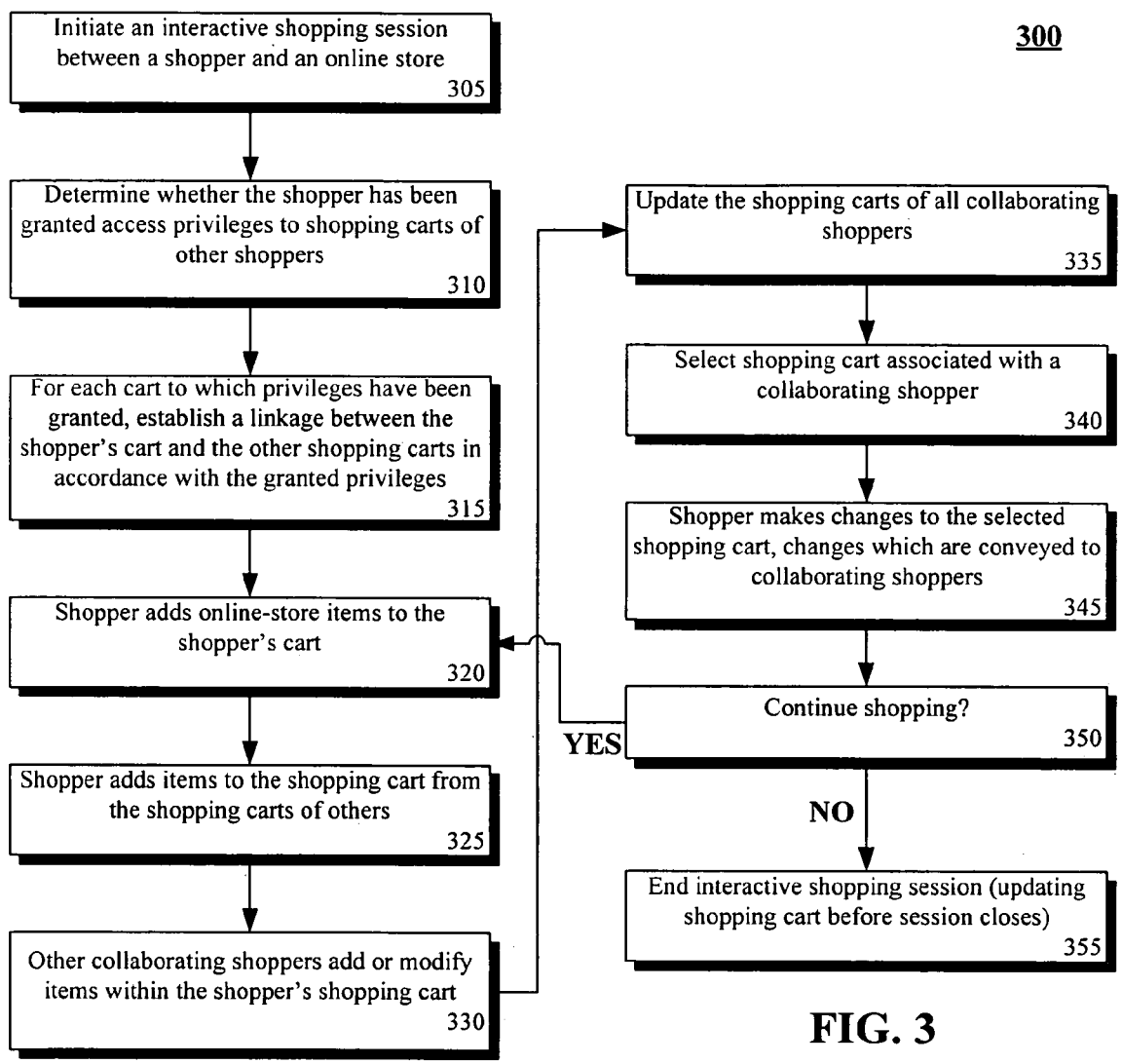
FIG. 3 is a flow chart of a method for shoppers to collaborate upon electronic purchases in accordance with an embodiment of the present invention.

FIG. 3 is a flow chart of a method 300 for shoppers to collaborate upon electronic purchases in accordance with an embodiment of the present invention. Method 300 can be performed in the context of a Web-based shopping system, such as system 100 of FIG. 1.

Method 300 can begin in step 305, where an interactive shopping session between a shopper and an online store can be initiated. Initiation can occur when a user accesses a shopping Web site via a browser. The initiation can require the user to log onto the online store, which may require the user provide a user name and password. In step 310, a determination can be made as to whether the shopper has been granted access privileges to shopping carts of other shoppers. In step 315, for each shopping cart to which privileges have been granted, a linkage can be established. The linkage can be between any number of shopping carts utilizing a hub and spoke methodology, where the linkage operates in accordance with the granted privileges.

Once proper collaboration linkages have been established, the method can proceed to step 320, where the shopper can interact with the online store. Some of these interactions can result in changes being made to the shoppers own shopping cart. For example, in step 320, the shopper can select items from the online store and place these items in the shopper's shopping cart. In step 325, the shopper can select items from the shopping carts of others and place those items in the shopper's shopping cart. In step 330, other shoppers (that have been granted privileges) can modify the shopper's shopping cart. In step 335, changes made to the shopper's shopping cart can cause corresponding changes to be made within representations of the shopping cart presented to collaborating shoppers. These changes can be dynamically implemented in real-time or near-real time.

In addition to changing the items of the shopper's own cart, the shopper can modify items contained in the shopping carts of others. For example, in step 340 the shopper can select a cart associated with a collaborating shopper. In step 345, the shopper (assuming appropriate privileges have been granted) can add or delete items from the selected cart. These changes can be dynamically implemented causing suitable changes to occur in the interfaces provided to all collaborating shoppers. In step 350, a decision can be made by the shopper to continue shopping or not. If the shopper chooses to continue shopping, the method can loop to step 320. If the shopper chooses to end the interactive shopping session the method can proceed from step 350 to step 355.

In step 355, appropriate updates can be made (session details transferred from volatile memory to persistent memory as appropriate) and the interactive shopping session can terminate. Notably, other shoppers can continue to shop within their individual shopping sessions (and even retain access to the shopper's shopping cart in some embodiments) even though the shopper has ended the session in step 355.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for collaborating between Web-based shopping carts comprising the steps of:
    identifying a Web-based shopping cart associated with an online store and a shopper of the shopping cart;
    establishing access privileges between the shopping cart and at least one other collaborating shopping cart, said other collaborating shopping cart being associated with at least one other shopper, the access privileges including at least one among reading, updating, adding, and deleting privileges;
    establishing a linkage between the Web-based shopping cart and the at least one other collaborating shopping cart in accordance with the access privileges; and
    through the linkage, permitting the shopper to access items in the other collaborating shopping cart;
    wherein items are transferrable between the Web-based shopping cart and the other collaborating shopping cart.

2. The method of claim 1, wherein the shopper interfaces with the online store through an online store portal, which comprises a shopping cart portlet, wherein the Web-based shopping cart is contained within the shopping cart portlet.

3. The method of claim 2, wherein the online store portal further comprises a messaging portlet for interactive communication between the shopper and the other shoppers.

4. The method of claim 2, wherein the online store portal comprises a collaborating shopping cart portlet, wherein the shopper accesses the items in the other shopping cart through the collaborating shopping cart portlet, wherein items are selectively transferable from the collaborating shopping cart portlet to the shopping cart portlet.

5. The method of claim 4, wherein the at least one other shopping cart comprises a plurality of shopping carts, and wherein the collaborating shopping cart portlet contains a cart selection interface element for selecting which of the plurality of shopping carts is to be presented within the collaborating shopping cart portlet.

6. The method of claim 1, wherein the access privileges have been previously configured by a shopper associated with a shopping cart to which the access privileges apply, wherein configurable access privileges include a view permission and an add items permission.

7. The method of claim 1, wherein the shopper and the other shoppers interact with the online store in different, shopper-specific interactive shopping sessions, each interactive shopping session having an associated session-specific shopping cart.

8. The method of claim 7, wherein the permitting step operates when the interactive shopping sessions occur at the same time or at different times.

9. A system for collaborating between Web-based shopping carts for Web purchases comprising:
    at least one memory; and
    at least one processor configured to:
    identify a Web-based shopping cart associated with an online store and a shopper of the shopping carts;
    establish access privileges between the shopping cart and at least one other collaborating shopping cart, the other collaborating shopping cart being associated with at least one other shopper, the access privileges including at least one among reading, updating, adding, and deleting privileges;
    establish a linkage between the Web-based shopping cart and the at least one other collaborating shopping cart in accordance with the access privileges; and
    permit the shopper to access items in the other collaborating shopping cart through the linkage;
    wherein items are transferable between the Web-based shopping cart and the other collaborating shopping cart.

10. The system of claim 9, wherein the collaboration occurs dynamically and in near real time when the shopper and the other shopper are simultaneously logged onto the online store.

11. The system of claim 9, wherein the collaboration occurs when a user associated with at least one of the shopping cart and the other shopping cart is not logged onto the online store.

12. The system of claim 9, further comprising: a user configurable collaboration list configured to grant users on the list with collaborative access to the shopping cart, wherein the other shopper is a user on the collaboration list.

13. The system of claim 9, wherein the shopping cart is a portlet of an online shopping portal, the online shopping portal further comprising:
    an online store portal within which the items available through the online store are presented for selection; and
    a messaging portlet for interactive communications between the shopper and the other shopper.

14. The system of claim 13, wherein the at least one other shopping cart includes a plurality of shopping carts, and wherein the online portal includes a plurality of user selectable tabs, each tab associated with one of the shopping carts, wherein the collaboration occurs in accordance with the shopping cart associated with a selected tab.

* * * * *

UNITED STATES PATENT AND TRADEMARK OFFICE
CERTIFICATE OF CORRECTION

| | | |
|---|---|---|
| PATENT NO. | : 7,647,247 B2 | Page 1 of 1 |
| APPLICATION NO. | : 11/005356 | |
| DATED | : January 12, 2010 | |
| INVENTOR(S) | : Abraham et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 996 days.

Signed and Sealed this

Sixteenth Day of November, 2010

David J. Kappos
*Director of the United States Patent and Trademark Office*